Figure 1:
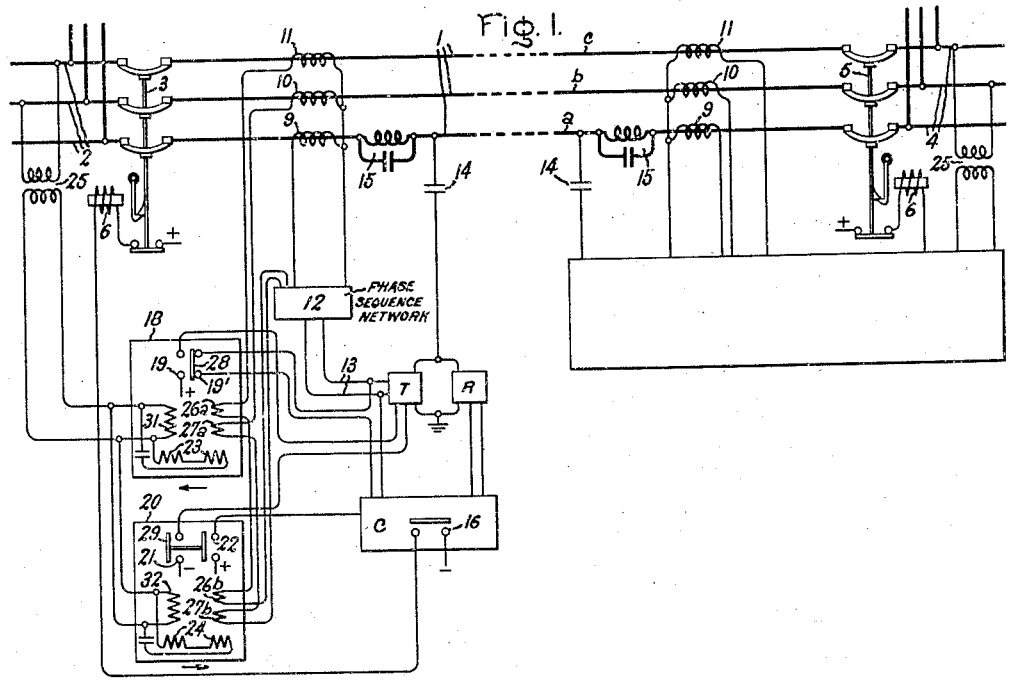

Inventor:
Andrew J. McConnell,
by Ernest C. Britton
His Attorney.

Patented Apr. 29, 1947

2,419,904

UNITED STATES PATENT OFFICE 2,419,904

CARRIER CURRENT PROTECTIVE RELAYING SYSTEM

Andrew J. McConnell, Albany, N. Y., assignor to General Electric Company, a corporation of New York Application August 21, 1945, Serial No. 611,896

13 Claims. (Cl. 175—294)

My invention relates to protective relaying systems for electric power circuits and particularly to such systems of the phase comparison type which utilize a pilot or communication channel to compare the phase relation of two similar alternating current quantities respectively present at two predetermined points of the power circuit such as the ends of a line section to be protected.

In some protective relaying systems of the phase comparison type, a single phase quantity is derived from the currents in the same power circuit conductors at each end of the line section being protected. Each single phase quantity is arranged to effect a predetermined control operation at its respective end of the line section, such as the opening of a power circuit breaker at that end, when a predetermined phase relationship exists between it and the derived single phase quantity at the other end of the line section. Successful operation of these prior art relaying systems of the phase comparison type has depended upon corresponding currents at the two ends of the protected line section being substantially in phase under all normal and external fault conditions. Since such current conditions exist on short line sections, these prior relaying systems have operated satisfactorily on such line sections. On long high voltage line sections, however, the relative phases of corresponding currents at the two ends thereof under different normal and external fault conditions may be quite different due to the charging current which enters a sound line section at each end thereof. Under certain normal operating conditions, the phase relationship may be the same as exists when an internal balanced polyphase load or fault is connected to the line section. For example, a study of a 300-mile, three-phase transmission line having approximately equal impedance back of the two line terminals showed that the magnitude of the charging current entering each end of the line was almost equal to the full load current and that, with equivalent terminal voltages, the currents at the two ends were 180° out of phase with the terminal voltages in phase. With a 30° displacement between the terminal voltages, the currents at the ends were 115° out of phase, and with a 60° displacement between the terminal voltages, the currents were 65° out of phase.

Since the charging current is a substantially balanced polyphase current, it is evident that if such a transmission line is protected by a phase comparison relaying system employing for comparison purposes two single phase voltages which are respectively proportional to a function of the positive phase sequence voltages at the two ends, so that it can protect the line against internal three-phase faults as well as other types of internal faults, improper operation of the system may occur under normal balanced load conditions and external three-phase fault conditions.

One object of my invention is to provide an improved pilot relaying system which functions properly under all load and fault conditions.

It is a further object to provide a protective relaying system which functions properly on electric systems in which the short-circuit currents under minimum generating conditions may be comparable with or even less than the maximum load current.

Another object of my invention is to provide an improved pilot relaying system of the phase comparison type which may be used to protect longer line sections than any heretofore known prior art system of a similar type.

A still further object of my invention is to provide an improved pilot relaying system of the phase comparison type which is especially adapted for use on power circuits in which there are present large charging currents which materially affect the relative phase angles of corresponding currents at different points on the circuit.

I have found that on external unbalanced faults the angular displacements between the negative phase sequence currents entering and leaving a line section and between the zero phase sequence currents entering and leaving a line section are small. Therefore in accordance with my invention, a line section to be protected is provided with a phase comparison relaying system which compares the negative phase sequence currents or a combination of the negative and zero phase sequence currents at the two ends thereof. Since such a relaying system does not respond to balanced polyphase load and fault currents, means are also provided whereby the presence in the protected line section of such balanced currents under predetermined abnormal circuit conditions causes the relaying system to function and effect the desired protective operations. Preferably the balanced fault responsive means is such that its operation is substantially unaffected by the charging current. In accordance with the preferred embodiment of my invention, I accomplish this additional protection merely by the addition to the phase comparison system of two single phase directional relays with voltage restraint at each end of the protected line section.

Figure 2:
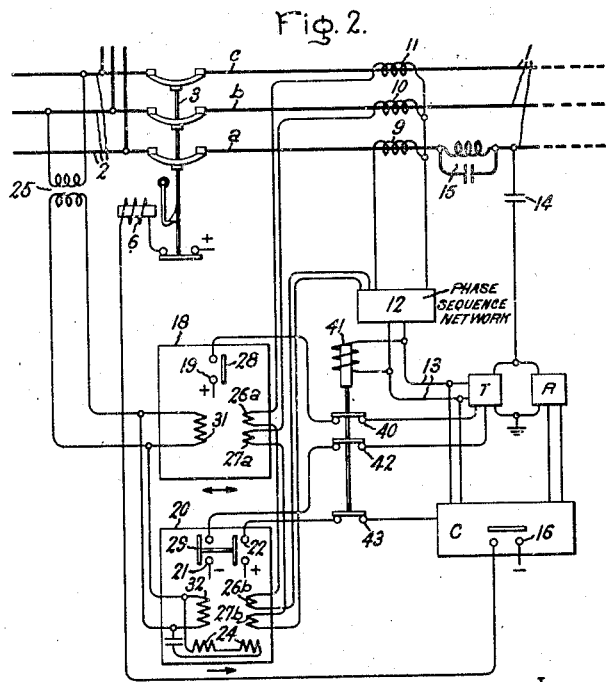

My invention will be better understood from the following description when taken in connection with the accompanying drawing, Fig. 1 of which illustrates a preferred embodiment of my invention in connection with a protective relaying arrangement for one end of a protected line section of an electric power circuit, and Fig. 2 of which is a modification of the embodiment of my invention shown in Fig. 1, and the scope of my invention will be pointed out in the appended claims.

In the embodiment of my invention shown in Fig. 1, the protected apparatus is a line section 1 of a three-phase power circuit having line conductors a, b, and c. One end of the line section 1 is connected to a bus 2 by a suitable circuit interrupter 3, and the other end of the line section 1 is connected to a bus 4 by a suitable circuit interrupter 5. The circuit interrupters 3 and 5 are respectively provided with trip coils 6 for effecting the opening thereof.

Since the protective equipment at the two ends of the protected line section 1 may be identical, I have shown in detail only that portion of the equipment at the line section end which is connected to the bus 2 as is deemed necessary for a clear understanding of my invention. It is to be understood, however, that a similar arrangement of apparatus is associated with the circuit interrupter 5 at the other end of the protected line section.

Each end or terminal equipment of the relaying system comprises a bank of three current transformers 9, 10, and 11 respectively connected in series relation with the line conductors a, b, and c and energizing a suitable phase sequence network 12 which is arranged to impress across the output 13 thereof a single phase voltage which is proportional in magnitude to the negative phase sequence current flowing in the protected line section 1 at the point where the current transformers 9, 10, and 11 are connected thereto.

Since it is desirable to have each terminal equipment of the relaying system adaptable for use on a power circuit in which a ground fault on the protected line section may not result in the flow of enough negative phase sequence current to cause the voltage of the output circuit 13 to reach a desired minimum operating value, each negative phase sequence network 12 may also be provided with means for biasing it with zero phase sequence current in any well-known manner. In my copending application, Serial No. 595,722, filed May 25, 1945, there is disclosed a negative phase sequence network which is especially adapted for use in my present invention since it is provided with means for readily biasing the negative phase sequence network so that the output thereof may be a function of both the negative and zero phase sequence currents. Therefore it is to be understood that the expression "negative phase sequence network" as used in the specification and claims included such a biased network as well as one which produces a single phase voltage which is a function of the negative phase sequence current only. The voltage of the network output circuit 13 is utilized as a means for controlling the energizing circuit of the trip coil 6 of the associated circuit interrupter so that the trip coil can be sufficiently energized to effect the opening of the circuit interrupter only when the output voltage of the network 12 exceeds a predetermined value not produced by normal load currents in the line conductors a, b, and c of the protected line section 1. The single phase output voltage of the network 12 also controls the operation of a suitable transmitter for transmitting a suitable high frequency current over one of the line conductors of the protected line section such, for example, as the line conductor a, and controls the operation of a suitable comparison device which compares the phase relation of the phase sequence network output voltages at the two ends of the protected line section.

As shown in Fig. 1, a high frequency transmitter T and a high frequency receiver R are connected by suitable coupling means, such as a capacitor 14, between the ground and the line conductor a. A line trap 15 is inserted in the line conductor a near each end of the line section 1 to prevent an external fault between the line conductor a and the ground from short circuiting the high frequency channel and also to prevent the high frequency current from being transmitted into the adjacent bus. All of the transmitters T and receivers R may be tuned to the same frequency so that each receiver R can receive high frequency current from the transmitter at either end of the line section or the transmitter T at one end and receiver R at the other end may be tuned to one frequency, and the receiver at said one end and the transmitter at said other end may be tuned to a different frequency. A comparison device C is associated with the receiver R and the associated network output circuit 13 in such a manner as to effect the energization of the associated trip coil 6 during predetermined half cycles of the associated network output voltage if, during the same half cycles, no high frequency current is being received by the associated receiver R. Since pilot relaying systems of the phase comparison type, in which high frequency transmitters are arranged to transmit only during a predetermined half cycle of a relatively low frequency single phase voltage and in which comparison devices are arranged to effect a predetermined switching operation only when the associated receiver does not receive high frequency current during the other half cycle of the relatively low frequency single phase voltage, are well known in the art and since my present invention is not limited to the details of such transmitters, receivers and comparison devices, they are represented in the drawing by rectangles in order to simplify the disclosure. The comparison device C is shown as having contacts 16 which are arranged to be closed in response to a half cycle of voltage of the output circuit 13 during which the associated transmitter T is inoperative if, during that same half cycle, the associated receiver R is receiving no high frequency current from the transmitter T at the other end of the line section 1.

The polarities of the network output voltages at the two ends of the protected line section 1 are such that when negative phase sequence current flows into one end of the line section and out of the other end, the polarities of the two output voltages are substantially 180° out of phase and these output voltages under such conditions control their respective transmitters T in such a manner that during the half cycle when the transmitter T at one end is operative, the transmitter at the other end is inoperative, and vice versa, when the transmitter at said other end is operative, the transmitter at said one end is inoperative. Consequently, under external fault conditions which cause negative phase sequence current to flow into one end of the line section and out of the other end, high frequency current is continuously transmitted over the line conductor $a$, and the comparison device C at each end of the protected line section is rendered inoperative to close its contacts 16. Under internal fault conditions which cause negative phase sequence current simultaneously to flow into the line section at each end, the polarities of the network output voltages at the two ends of the line section are substantially in phase so that during the half cycle when the transmitter T at one end is operative, the transmitter at the other end is also operative and during the half cycle when the transmitter T at one end is inoperative, the transmitter T at the other end is also inoperative. Consequently, under internal fault conditions which cause negative phase sequence currents to flow simultaneously into the line section at each end thereof, the comparison device C at each end closes its respective contacts 16 since the associated receiver R does not receive high frequency current during the particular half cycle of the output voltage of the associated phase sequence network 12 that the device C is operative.

As is well known to those skilled in the art, the voltage across the output circuit 13 of the network 12 is substantially zero under balanced load and fault conditions in the line section 1 since substantially only positive phase sequence current is present in the line section under such current conditions. In order to provide protection against three-phase faults, I provide each terminal equipment with suitable fault responsive means for controlling the transmitters T so as to effect a continuous transmission of blocking current over the conductor $a$ of line section 1 while a three-phase external fault is connected to the system and so that no blocking current is transmitted over the conductor $a$ of line section 1 while a three-phase internal fault is connected to the line section 1.

While various types of fault responsive means may be employed to effect the desired control of the transmitters T under three-phase fault conditions, I find that complete protection can be obtained by merely adding two single phase directional impedance relays 18 and 20 to each terminal equipment of the phase comparison relaying system. Each directional impedance relay 18 is connected to the line section 1 in any suitable manner so that the relay closes its contacts 19 and opens its contacts 19' when the power in the line conductors to which the relay is connected flows out of the line section 1 at the adjacent end thereof and when the apparent impedance as seen by the relay 18 is within its impedance setting. Each directional relay 20 is connected to the line section 1 in any suitable manner so that the relay closes its contacts 21 and 22 when the power in the line conductors to which the relay is connected flows into the line section 1 at the adjacent end thereof, and when the apparent impedance, as viewed by the relay, is within its impedance setting, a setting sufficient to operate for all three-phase faults within line section 1, with a margin.

In order to obtain satisfactory operation, it is necessary that the operating characteristics of the relays 18 and 20 be such that if the relay 18 responds to an internal fault on the line section 1, the relay 20 at the same end must also respond to the same internal fault, and if a relay 20 at one end responds to any external fault at the other end, the relay 18 at said other end of the line section must also respond to the same external fault. The proper operating characteristics of the single phase directional impedance relays 18 and 20 may be obtained by using various well-known types of single phase directional and impedance relays, either in combination or alone and it is to be understood that the expression "directional impedance relay" is intended to cover all such well-known types which may be used in carrying out my invention. In the preferred embodiment of my invention, however, the relays 18 and 20 are single phase voltage restrained directional relays, the relays 20 being of the type commonly known as mho relays and the relays 18 being of the type commonly known as current biased or modified mho relays. The operating characteristic of the relays 18 and 20 at each end overlaps so that any internal fault that effects the operation of modified mho relay 18 also effects the operation of the mho relay 20. Also if the reach of the mho relay 20 extends beyond the far end of the line section 1, any external fault beyond said far end that may effect the operation of the mho relay also effects the operation of the modified mho relay 18 at the far end of the line section 1.

The voltage restrained directional relays 18 and 20 are respectively shown as having voltage windings 23 and 24 which are connected by means of a suitable potential transformer 25 across the line conductors $b$ and $c$, with current windings 26a and 26b which are connected in series relation with the secondary winding of the current transformer 11 and with current windings 27a and 27b which are connected in series relation with the secondary winding of the current transformer 10 so that a torque is exerted on a movable member 28 of relay 18 in a direction to close the contacts 19 and open the contacts 19' when power flows from the line section 1 into the bus 2 and a torque is exerted on a movable member 29 of relay 20 in a direction to close the contacts 21 and 22 when power flows from the bus 2 into the line section 1. The relays 18 and 20 are also respectively provided with voltage restraining windings 31 and 32 which are connected to the potential transformer 25 and which in conjunction with voltage windings 23 and 24 respectively are arranged to produce, in a direction to maintain the movable members 28 out of engagement with their respective contacts 19 and their engagement with their respective contacts 19' and the movable members 29 out of engagement with their respective contacts 21 and 22, a restraining torque proportional to the square of the voltage between the line conductors $b$ and $c$.

The closing of the contacts 19 of relays 18 controls the transmitter T in any suitable manner so that it continuously transmits high frequency current over the line conductor $a$ of the line section 1 as long as the contacts 19 are closed and contacts 21 of relay 20 are open. The contacts 19' control the connections between the associated network 12 and comparison device C so that when the contacts 19' are open the comparison device C is not responsive to the output voltage of the associated network 12. The closing of the contacts 21 of relay 20 controls the transmitter T in any suitable manner so that it is inoperative to transmit any high frequency current over the line conductor $a$ even though the contacts 19 are closed and even though there is a voltage across the network output circuit 13 which, normally, is sufficient to effect the operation of the transmitter T. The closing of the contacts 22 of the relay 20 controls the comparison device C in any suitable manner so that even though the contacts 19' of the associated relay 18 are open, the comparison device C can close its contacts 16 if the associated receiver R is not receiving high frequency current from the line conductor a.

Since the detailed circuit connections of the transmitter T and the comparison device C are well known in the art, they have been omitted from the drawing in order to simplify it.

The operation of the embodiment of my invention shown in Fig. 1 is as follows when the transmitters T and receivers R at both ends of the line section 1 are tuned to substantially the same frequency: During normal operating conditions, the load impedances are such that the voltage restrained directional relays 18 maintain their contacts 19 open and the relays 20 maintain their respective contacts 21 and 22 open. Also, since the combined charging and load current present at each end of the protected line section 1 is a substantially balanced current, substantially no voltage appears across the output circuit 13 of the phase sequence network 12. Consequently the transmitter T and the comparison device C are normally inoperative.

When a three-phase fault or any other fault occurs outside of the line section 1 and within the operating range of the directional relay 18 at the line section end nearer the fault, a high frequency blocking current is continuously transmitted over the line conductor a of the protected line section 1 as long as the external fault remains connected to the line section. This continuous transmission of blocking current is due to the contacts 19 of the relay 18 being closed. This blocking current operates the receiver R at each end of the line section 1 so that their associated comparison devices are rendered inoperative to close their respective contacts 16. Consequently, the circuit interrupters 3 and 5 at the ends of the line section 1 remain closed under such external fault conditions.

During unbalanced faults which do not effect the operation of the directional relays 18 and 20, the output voltages of the phase sequence networks 12 of the phase comparison relaying system are compared in the well-known manner. For example, if the fault is on the line section 1, the transmitters T at both ends of the line section transmit high frequency blocking current simultaneously during the same half cycle of the output voltage and are simultaneously inoperative during the other half cycles when the comparison devices C at both ends are operative. Therefore, the comparison devices C close their respective contacts 16 and effect the opening of the associated circuit interrupters under such internal fault conditions. If the unbalanced fault which does not effect the operation of the relays 18 and 20 is outside of the line section 1, the transmitters T at the two ends of the line section respectively transmit during alternate half cycles of the output voltages so that each receiver R renders the associated comparison device C inoperative to close its contacts 16 during the only half cycle the comparison device can operate to close its contacts. Consequently the circuit interrupters 3 and 5 remain closed under such unbalanced external fault conditions.

When a three-phase fault or any other fault occurs on the line section 1 so that the directional relays 20 at both ends of the line section close their respective contacts 21 and 22, the associated transmitters T are rendered inoperative and the respective comparison devices C are rendered operative. Since no high frequency blocking current is transmitted over the line conductor a of the line section 1 under such fault conditions, each comparison device C immediately closes its contacts 16 to effect the energization of the trip coil 6 of the associated circuit interrupter.

Under certain internal unbalanced fault conditions, the directional relay 20 at one end of the line section may fail to close its contacts 21 and 22 while the relay 20 at the other end closes its contacts 21 and 22. Under such operating conditions, the transmitter T and comparison device C associated with the relay 20 which fails to operate are rendered operative during alternate half cycles of the output voltage of the associated phase sequence network 12. At the end where the relay 20 operates, the associated transmitter T is rendered inoperative and the associated comparison device C is rendered operative to close its contacts 16 if no continuous blocking current is received by the associated receiver R. Consequently, at the end where the relay 20 operates, the associated comparison device C closes its contacts 16 and effects the opening of the circuit interrupter at that end during the half cycle when no blocking current is being transmitted by the transmitter T associated with the unoperated relay 20. At the end where the relay 20 does not operate, the associated comparison device C closes its contacts 16 and effects the opening of the circuit interrupter at that end during the half cycle when the comparison device C is energized from the associated network 12 because no blocking current is then being transmitted by the transmitter T associated with the operated relay 20.

When the transmitters T at the opposite ends of the line section 1 are tuned to different frequencies and the receiver R at each end is tuned to the frequency of the transmitter T at the other end, the operation of the relaying system under fault conditions is the same as above described except when an external fault condition occurs which effects the operation of both the directional relay 18 at the line section end adjacent to the fault and the directional relay 20 at the line section end remote from the fault. Under such an external fault condition, the transmitter T at the remote end of the line section is inoperative so that no blocking current of the proper frequency is transmitted over phase conductor a to operate the receiver R at the line section end adjacent to the fault and prevent the operation of the associated comparison device C. This comparison device C however does not close its contacts 16 beause it is inoperative since the connection between the network 12 and the comparison device C is open at the contacts 19' of the operated relay 18. Also in case the external fault is a three-phase one, the voltage across the output circuit 13 of the associated networks 12 is too low to effect the operation of the comparison device C even if the contacts 19' were omitted. Therefore, the circuit breakers at the ends of the line section 1 remain closed under such external fault conditions.

It will be noted that the contacts 19' are necessary only under certain unbalanced external fault conditions when the transmitters T at the opposite ends of the line section 1 are tuned to different frequencies so that the contacts 19' may be omitted in a relaying system in which all of the transmitters T are tuned to the same frequency.

In the modification of my invention shown in Fig. 2, the fault responsive relay 18 is a single phase impedance relay which as is well known in the art is nondirectional and therefore responds to faults on the line section 1 as well as on the adjacent bus section 2 and any other line section connected to line section 1. Due to the fact that an impedance relay is a type of distance relay which responds to a much larger angular range of impedances than the directional type of relay used in the embodiment of my invention shown in Fig. 1, there is a possibility that the impedance relay 18 in Fig. 2 may operate in response to internal unbalanced faults which involve the line conductors $a$ and $c$ or $b$ and $c$ and which do not effect the operation of the associated distance relay 20. Such an operation of the relay 18 would effect the undesired operation of the associated transmitter T to transmit a blocking signal continuously under an internal fault condition. In order to prevent such an undesirable continuous operation of a transmitter, I provide the associated impedance relay 18 with only the contacts 19 and connect in series with these contacts the normally closed contacts 40 of a voltage relay 41 which is connected across the output circuit 13 of the network 12 and which is arranged to open the contacts 40 in response to any voltage which may be produced across the output circuit 13 by any unbalanced fault that may occur on the protected line section 1. The relay 41 is also provided with the normally closed contacts 42 which are in series with the contacts 21 of the associated relay 20 and with the normally closed contacts 43 which are in series with the contacts 22 of the associated relay 20 so that while the relay 41 is operated the associated transmitter T, receiver R, and comparison device C are controlled by the phase relation of the output voltages of the networks 12 at the two ends of the protected line section 1.

The operation of the modification shown in Fig. 2 is the same as the arrangement shown in Fig. 1 as far as any three-phase fault is concerned. Under unbalanced fault conditions, however, the relay system operates as a phase comparison system since the voltage relays 41 at the two ends of the protected line section render the associated relays 18 and 20 inoperative to control the operation of the associated transmitters T and comparison devices C in response to any unbalanced fault that can effect the operation of the relays 18 and 20.

While I have shown, in accordance with the patent statutes, and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising means responsive to a balanced polyphase fault on the adjacent section for controlling the associated transmitter so that it transmits high frequency current continuously, and means responsive to a balanced polyphase fault on the protected line section for rendering the associated transmitter inoperative and for rendering the associated comparison means operative to effect said predetermined relaying operation if no high frequency current is being transmitted by the transmitter at the other end.

2. In a phase comparison pilot relaying system for a section of a polyphase circuit on which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising means for effecting the operation of the associated transmitter in response to a balanced polyphase fault on the adjacent section, and means for stopping the operation of the associated transmitter and for rendering the associated comparison means operative in response to any fault on the protected section that can effect the operation of said balanced polyphase fault responsive means, said balanced polyphase fault responsive means being responsive to all external faults on the adjacent section which can effect the operation of the stopping means at the other end of the line section.

3. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase directional impedance relay arranged when connected to said circuit to effect the operation of the associated transmitter in response to faults on the adjacent section, and a second single phase directional impedance relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

4. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase current biased directional impedance relay arranged when connected to said circuit to effect the operation of the associated transmitter in response to faults on the adjacent section, and a single phase directional impedance relay arranged when connected to said circuit to stop the operation of the associated transmitter and to render the associated comparison means operative in response to any fault on the protected section that can effect the operation of said first mentioned relay, said first mentioned relay being responsive to all external faults on the adjcent section which can effect the operation of the stopping relay at the other end of the line section.

5. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase voltage restrained directional relay arranged when connected to said circuit to effect the operation of the associated transmitter in response to faults on the adjacent section, and a second single phase directional impedance relay arranged when connected to said circuit to stop the operation of the associated transmitter and to render the associated comparison means operative in response to any fault on the protected section that can effect the operation of said first mentioned relay, said first mentioned relay being responsive to all external faults on the adjcent section which can effect the operation of the stopping relay at the other end of the line section.

6. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase voltage restrained directional relay arranged when connected to said circuit to effect the operation of the associated transmitter in response to faults on the adjacent section, and a second single phase voltage restrained directional relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

7. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase directional impedance relay arranged when connected to said circuit to effect the operation of the associated transmitter in response to faults on the adjacent section, and a second single phase voltage restrained directional relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

8. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase current biased voltage restrained directional relay arranged when connected to said circuit to effect the operation of the associated transmitter in response to faults on the adjacent section, and a single phase directional impedance relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

9. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase current biased voltage restrained directional relay arranged when connected to said circuit to effect the operation of the associated transmitter in response to faults on the adjacent section, and a single phase voltage restrained directional relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

10. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase impedance relay arranged when connected to said circuit to effect the operation of the associated transmitter in response to faults on the adjacent section, and a second directional impedance relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

11. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, and comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase impedance relay arranged when connected to said circuit to effect the operation of the associated transmitter in response to faults on the adjacent section, and a second voltage restrained directional relay arranged when connected to said circuit to stop the operation of the associated transmitter and to render the associated comparison means operative in response to any fault on the protected section that can effect the operation of said first mentioned relay, said first mentioned relay being responsive to all external faults on the adjacent section which can effect the operation of the stopping relay at the other end of the line section.

12. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase impedance relay arranged when connected to said circuit to effect the operation of the associated transmitter in response to faults on the adjacent section, and a second single phase directional impedance relay arranged when connected to said circuit to stop the operation of the associated transmitter and to render the associated comparison means operative in response to balanced faults on the protected section, said first mentioned relay being responsive to all external faults on the adjacent section which can effect the operation of the stopping relay at the other end of the line section, and means responsive to the derived voltage of the associated network exceeding a predetermined value for preventing said relays from controlling the operation of the associated transmitter and comparison means.

13. In a phase comparison pilot relaying system for a section of a polyphase circuit in which there is provided at each end of the section a negative phase sequence network for deriving from the circuit a single phase voltage proportional to a function of the negative phase sequence current present in the circuit at that end, a high frequency current transmitter, means controlled by the derived single phase voltage for effecting the operation of the transmitter during a predetermined half cycle of each cycle of derived single phase voltage, comparison means controlled by the derived single phase voltage and the high frequency current transmitted from the other end for effecting a predetermined relaying operation during the other half cycle of each cycle of derived voltage if during said other half cycle no high frequency current is received from the other end, a control arrangement for each end of the protected section comprising a single phase impedance relay arranged when connected to said circuit to effect the operation of the associated transmitter in response to faults on the adjacent section, and a second single phase voltage restrained directional relay arranged when connected to said circuit to stop the operation of the associated transmitter and to render the associated comparison means operative in response to balanced fault on the protected section, said first mentioned relay being responsive to all external faults on the adjacent section which can effect the operation of the stopping relay at the other end of the line section, and means responsive to the derived voltage of the associated network exceeding a predetermined value for preventing said relays from controlling the operation of the associated transmitter and comparison means.

ANDREW J. McCONNELL.